(12) United States Patent
Yun

(10) Patent No.: US 8,765,513 B2
(45) Date of Patent: Jul. 1, 2014

(54) SOLAR CELL AND METHOD OF MANUFACTURING THE SAME

(75) Inventor: Hogyeong Yun, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 602 days.

(21) Appl. No.: 12/875,900

(22) Filed: Sep. 3, 2010

(65) Prior Publication Data

US 2011/0308579 A1 Dec. 22, 2011

(30) Foreign Application Priority Data

Jun. 22, 2010 (KR) .......................... 10-2010-0059152

(51) Int. Cl.
*H01L 21/00* (2006.01)

(52) U.S. Cl.
USPC ............................................ 438/57; 136/252

(58) Field of Classification Search
USPC .................... 136/244, 252, 255–265; 438/57
See application file for complete search history.

(56) References Cited

U.S. PATENT DOCUMENTS

| 4,927,721 A | 5/1990 | Gratzel et al. |
| 2005/0274412 A1 | 12/2005 | Kang et al. |
| 2010/0258179 A1* | 10/2010 | Wieting .................. 136/256 |

FOREIGN PATENT DOCUMENTS

| JP | 2009-194024 A | 8/2009 |
| KR | 20090078958 A | 7/2009 |
| KR | 20100030003 A | 3/2010 |
| KR | 2010-0066288 A | 6/2010 |

* cited by examiner

*Primary Examiner* — Errol Fernandes
(74) *Attorney, Agent, or Firm* — Rabin & Berdo, P.C.

(57) ABSTRACT

Provided are a solar cell and a method of manufacturing the same. The method includes: preparing a bottom substrate including sequentially stacked first and second portions, each of the first and second portions including a plurality of grains, wherein the maximum grain size of the second portion is less than the minimum grains size of the first portion; exposing the first portion of the bottom substrate by removing the second portion of the bottom substrate; and forming a photovoltaic conversion layer on the first portion of the bottom substrate.

9 Claims, 10 Drawing Sheets

SOLAR CELL AND METHOD OF MANUFACTURING THE SAME

CROSS-REFERENCE TO RELATED APPLICATIONS

This U.S. non-provisional patent application claims priority under 35 U.S.C. §119 of Korean Patent Application No. 10-2010-0059152, filed on Jun. 22, 2010, the entire contents of which are hereby incorporated by reference.

BACKGROUND OF THE INVENTION

The present invention disclosed herein relates to a solar cell and a method of manufacturing the same.

A solar cell is a photovoltaic energy conversion system that coverts a light energy emitted from the sun into an electric energy. The solar cell uses an unlimited solar light as a resource as to generate electric power but does not produce environmental pollution during the electric power generation. Thus, the solar cell receives great attentions as a representative future eco-friendly energy resource. However, the solar cell has various limitations to be practical because photovoltaic energy conversion efficiency is relatively low. Accordingly, in order to practice the solar cell, many studies for increasing the photovoltaic energy conversion efficiency have been in process.

SUMMARY OF THE INVENTION

The present invention provides a solar cell with improved photovoltaic energy conversion efficiency and a method of manufacturing the same.

The present invention also provides a highly-reliable solar cell and a method of manufacturing the same.

Embodiments of the present invention provide methods of manufacturing a solar cell, the methods including: preparing a bottom substrate including sequentially stacked first and second portions, each of the first and second portions including a plurality of grains, wherein the maximum grain size of the second portion is less than the minimum grains size of the first portion; exposing the first portion of the bottom substrate by removing the second portion of the bottom substrate; and forming a photovoltaic conversion layer on the first portion of the bottom substrate.

In some embodiments, dispersion of sizes of the grains in the second portion of the bottom substrate may be greater than that of the grains in the first portion of the bottom substrate.

In other embodiments, the second portion may include a metal oxide.

In still other embodiments, the second portion may be removed using an etching process.

In even other embodiments, the etching process may be a wet etching process.

In yet other embodiments, the second portion may be removed using a polishing process or a sanding process.

In further embodiments, the methods may further include forming a top substrate on the bottom substrate, wherein the forming of the photovoltaic conversion layer includes: forming a semiconductor electrode layer including electrode dots on the first portion of the bottom substrate; adsorbing a dye layer on surfaces of the electrode dots; disposing the top substrate on the semiconductor electrode layer; and injecting an electrolyte between the bottom substrate and the top substrate.

In still further embodiments, the methods may further include forming a top substrate including an incident plane and an outgoing plane facing the incident plane on the bottom substrate, wherein the forming of the photovoltaic conversion layer includes: forming a semiconductor electrode layer with electrode dots on the outgoing plane of the top substrate; adsorbing a dye layer on surfaces of the electrode dots; disposing the top substrate on the bottom substrate; and injecting an electrolyte between the bottom substrate and the top substrate.

In even further embodiments, the forming of the photovoltaic conversion layer may include: forming a first semiconductor layer doped with a dopant of a first conductive type on the first portion of the bottom substrate; and forming a second semiconductor layer doped with a dopant of a second conductive type on the first semiconductor layer.

In other embodiments of the present invention, solar cells include: a bottom substrate formed by preparing a substrate including sequentially-stacked first and second portions having respectively different grain sizes, and removing the second portion to expose a top surface of the first portion, the exposed top surface of the second portion are active surface of the bottom substrate; a top substrate having one surface facing the active surface of the bottom substrate; and a photovoltaic conversion layer between the bottom substrate and the top substrate.

In some embodiments, each of the first portion and the second portion may include a plurality of grains and the maximum grain size of the second portion may be less than the minimum grain size of the first portion.

In other embodiments, the active surface of the bottom substrate may include angled grain boundaries in a plane view.

In still other embodiments, the photovoltaic conversion layer may include: a semiconductor electrode layer disposed on the active surface of the bottom substrate and including the electrode dots; a dye layer adsorbed on the surfaces of the electrode dots; and an electrolyte filling between the bottom substrate and the top substrate.

In even other embodiments, the solar cells may further include: a catalytic layer between the electrolyte and the top substrate; and a conductive layer between the catalytic layer and the top substrate.

In yet other embodiments, a portion of the electrode dots may be in contact with the active surface of the bottom substrate.

In further embodiments, the solar cells may further include: a conductive layer between the semiconductor electrode layer and the top substrate; and a catalytic layer between the electrolyte and the active surface of the bottom substrate.

In still further embodiments, a portion of the electrode dots may be in contact with the conductive layer.

In even further embodiments, the photovoltaic conversion layer may include: a first semiconductor layer disposed on the active surface of the bottom substrate and doped with a dopant of a first conductive type; and a second semiconductor layer disposed on the first semiconductor layer and doped with a dopant of a second conductive type.

In yet further embodiments, the solar cells may further include an intrinsic semiconductor layer between the first semiconductor layer and the second semiconductor layer.

In yet further embodiments, the active surface of the bottom substrate may have an uneven structure.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1A:
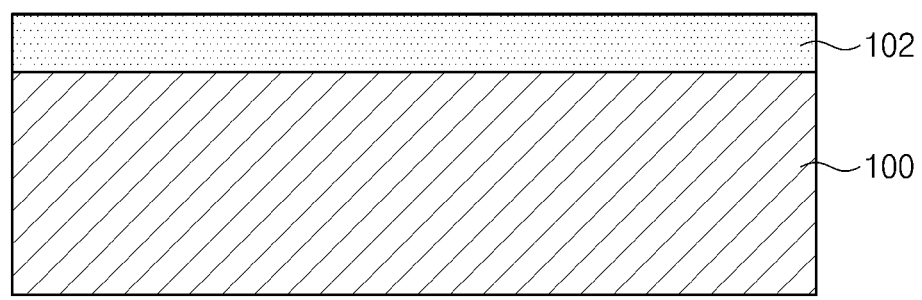
FIGS. 1A through 1D are sectional views illustrating a solar cell and a method of manufacturing the same according to the first embodiment of the present invention.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

In the drawings, the dimensions of layers and regions are exaggerated for clarity of illustration. It will also be understood that when a layer (or film) is referred to as being 'on' another layer or substrate, it can be directly on the other layer or substrate, or intervening layers may also be present. Further, it will be understood that when a layer is referred to as being 'under' another layer, it can be directly under, and one or more intervening layers may also be present. In addition, it will also be understood that when a layer is referred to as being 'between' two layers, it can be the only layer between the two layers, or one or more intervening layers may also be present. Like reference numerals refer to like elements throughout.

A method of manufacturing a solar cell will be described according to a first embodiment of the present invention. FIGS. 1A through 1D are sectional views illustrating a method of manufacturing a solar cell according to the first embodiment of the present invention.

Referring to FIG. 1A, a bottom substrate 100, 102 including sequentially-stacked first and second portions 100 and 102 is provided. The first portion 100 and the second portion 102 may include a plurality of grains. The minimum grain size of the grains in the first portion 100 may be greater than the maximum grain size of the grains in the second portion 102. An average size of the grains in the first portion 100 may be greater than that of the grains in the second portion 102. Dispersion of the grain size in the first portion 100 may be smaller than that of the grain size in the second portion 102. That is, the grains in the first portion 100 may have more uniform size than those in the second portion 102. The grains in the first portion 100 may be more regularly arranged than those in the second portion 102.

The first portion 100 may be form of metal, and the second portion 102 may be formed of metal or metal oxide. In this case, a metallic element included in the first portion 100 may be the same as that included in the second portion 102. For example, the metallic element may be titanium (Ti) or stainless steel. Unlike this, the first portion 100 and the second portion 102 may be formed of the same metal. For example, the first portion 100 is formed of Ti or stainless steel having a first size and the second portion 102 may be formed of Ti or stainless steel having a second size smaller than the first size. The first portion 100 may be formed Ti or stainless steel having a first size and the second portion 102 may be formed of Ti oxide or stainless steel oxide having a second size smaller than the first size.

Figure 1B:
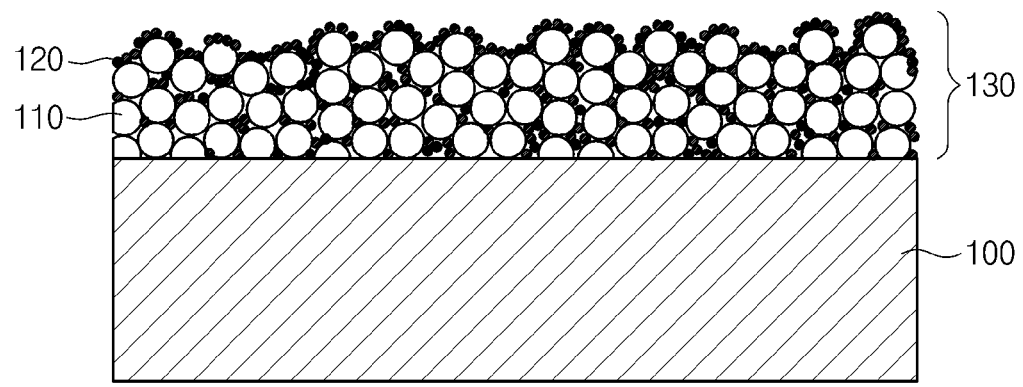

Referring to FIG. 1B, the second portion 102 may be removed. After the removing of the second portion 102, the top surface of the first portion 100 may be exposed. The top surface of the first portion 100 may include angled grain boundaries. The second portion 102 may be removed by an etching process. For example, the second portion 102 may be removed by a wet etching process. In this case, an acid solution (for example, hydrofluoric acid) may be used for the wet etching process. Unlike this, the second portion 102 may be removed through a polishing process or a sanding process. The sanding process is a process that smoothes the surface of a substrate using a polishing sheet, belt, or drum. The sanding process may be performed by hands or machine.

A photovoltaic conversion layer may be formed on the first portion 100 of the bottom substrate where the second portion 102 is removed. The photovoltaic conversion layer included in the solar cell according to the first embodiment may be a dye sensitive layer. A semiconductor electrode layer 130 including electrode dots 110 may be formed on the first portion 100 of the bottom substrate.

The semiconductor electrode layer 130 may be a transition metal, a compound including the transition metal, or a transition metal compound having a core-shell structure. The electrode dots 110 may be formed of titanium oxide particles having a size of about 3 nm to about 30 nm. The semiconductor electrode layer 130 including the electrode dots 110 may be coated with a thickness of about 5 nm to about 30 nm on the first portion 100 of the bottom substrate. In this case, the forming of the semiconductor electrode layer 130 may include coating a viscous colloid having nano particles of $TiO_2$ on the first portion 100 of the bottom substrate and then leaving the Ti oxide particles on the first portion 100 of the bottom substrate through a predetermined thermal treatment process.

In more detail, the preparing of the viscous colloid having nano particles of $TiO_2$ includes preparing liquid $TiO_2$ colloid and adding at least one of polyethylene glycol and polyethylene oxide after evaporating of solvent from the liquid $TiO_2$ colloid. At this point, the liquid $TiO_2$ colloid may be obtained using hydrothermal synthesis of titanium isopropoxide and acetic acid in an autoclave where a temperature of about 220° C. is maintained. Moreover, the evaporating of the solvent is performed until content of $TiO_2$ reaches about 10 weight % to about 15 weight %, and the $TiO_2$ nano particles constituting the electrode dots 110 are generated in the liquid $TiO_2$ colloid through this process. In order to allow a solution including the $TiO_2$ nano particles to have viscosity, polyethylene glycol and polyethylene oxide may be added and the added polyethylene glycol and polyethylene oxide may be removed through the thermal treatment process. This thermal treatment process may be performed at a temperature of about 450° C. to about 550° C. and as a result, the titanium oxide particles may remain on the first portion 100 of the bottom substrate.

A dye layer 120 may be adsorbed on the surface of the electrode dots 110. The forming of the dye layer 120 may include dipping the first portion 100 of the bottom substrate formed with the semiconductor electrode layer 130 in an alcohol solution including dye for about 24 hours. Then, after pulling of the first portion 100 of the bottom substrate out from the alcohol solution, the first portion 100 of the bottom substrate may be washed. At this point, the dye may be ruthenium complexes. For example, the dye may include N719(Ru (dcbpy)2(NCS)2 containing 2 protons. Additionally, at least one of dyes such as N712, Z907, Z910, and K19 may be used for a dye sensitive solar cell according to the present invention.

Figure 1C:
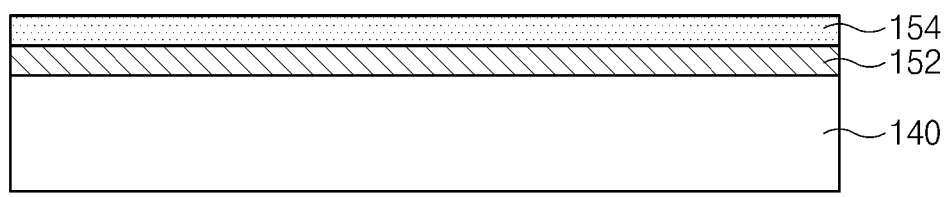

Referring to FIG. 1C, a top substrate 140 including an incident plane and an outgoing plane facing the incident plane may be prepared. The incident plane is a plane to which light is incident and the outgoing plane is a plane through which light transmitted from the top substrate 140 is outgoing. A conductive layer 152 and a catalytic layer 154 may be sequentially formed on the outgoing plane. The conductive layer 152 may be interposed between the catalytic layer 154 and the top substrate 140. The top substrate 140, the conductive layer 152, and the catalytic layer 154 may be included in a top substrate structure 140, 152, and 154.

The top substrate 140 may be formed of glass. The conductive layer 152 may include at least one of indium tin oxide (ITO), $SnO_2$, FTO, ZnO, or a carbon nano tube. The catalytic layer 154 may be formed by applying platinum of about 5 $\mu g/cm^2$ to about 10 $\mu g/cm^2$ on the conductive layer 152.

Figure 1D:
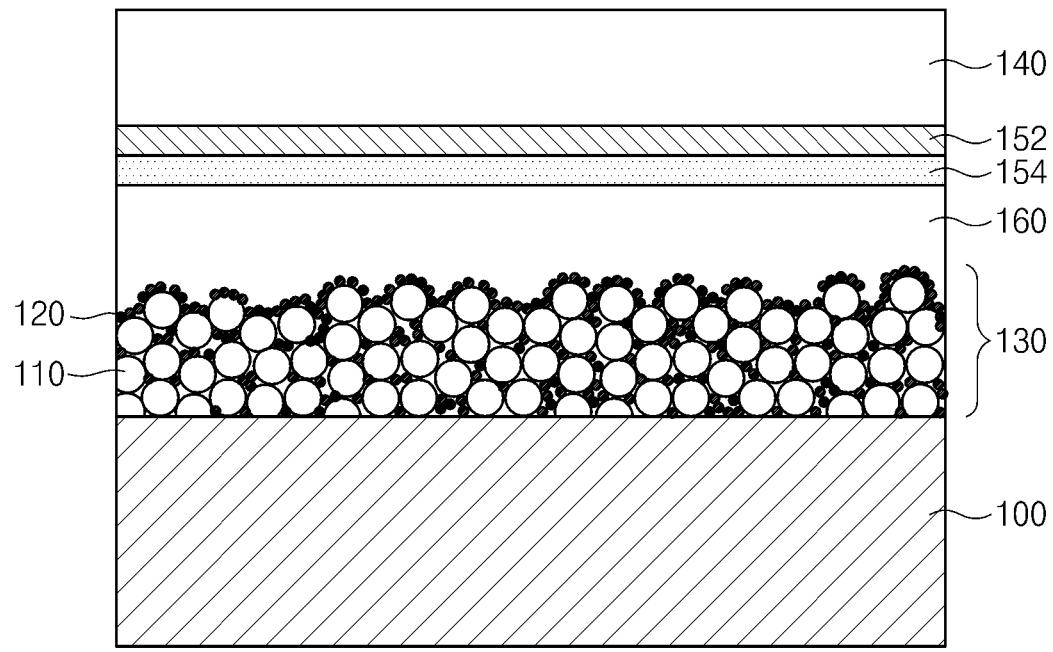

Referring to FIG. 1D, the top substrate structures 140, 152, and 154 may be disposed on the semiconductor electrode layer 130. In this case, the top substrate structures 140, 152, and 154 may be disposed to allow the catalytic layer 154 to be adjacent to the semiconductor electrode layer 130. For example, after forming of a predetermined polymer layer (not shown) between the first portion 100 of the bottom substrate and the top substrate structures 140, 152, and 154, the first portion 100 of the bottom substrate and the top substrate structures 140, 152, and 154 are compressed at a temperature of about 100° C. to about 140° C. and a pressure of about 1 atm to about 3 atm. At this point, as the polymer layer, SURLYN (i.e., a product name) sold by DuPont, may be used.

An electrolyte 160 may be injected between the first portion 100 of the bottom substrate and the top substrate structures 140, 152, and 154. The electrolyte 160 may be redox iodide electrolyte. For example, the electrolyte 160 may be a solution including 0.6M butylmethylimidazolium, 0.02M I2, 0.1M Guanidinium thiocyanate, and 0.5M 4-tert-butylpyridine. In addition, the electrolyte 160 may include alkylimidazolium iodides or tetra-alkyl ammoniumiodides and may further include tert-butylpyridin (TBP), benzimidazole (BI), and N-Methylbenzimidazole (NMBI) as surface additives. Moreover, acetonitrile, propionitrile or a mixture of acetonitrile and valeronitrile may be used as a solvent.

Light may be incident to the incident plane of the top substrate 140. The light incident to the incident plane of the top substrate 140 penetrates the top substrate 140, the conductive layer 152, the catalytic layer 154, and the electrolyte 160 and then may be projected on the dye layer 120. Due to the light projected o the dye layer 120, electrons of the dye layer 120 may be excited. In this case, a portion of the light may be projected on the dye layer 120 and another portion may be projected on the first portion 100 of the bottom substrate. The light projected on the first portion 100 of the bottom substrate may be reflected, and the reflected light projected on the dye layer 120. In terms of the reflectivity of the incident light, the first portion 100 may be higher than the second portion 102. Due to this, compared to when a dye layer is formed on the second portion 102, more light may be projected on the dye layer 120 formed on the first portion 100 and a quantity of the exited electrons of the dye layer 120 may be increased. Therefore, a solar cell with improved photovoltaic conversion efficiency can be provided.

The excited electrons of the dye layer 120 may be transferred to the first portion 100 of the bottom substrate through the electrode dots 110. The electrons transferred to the first potion 100 of the bottom substrate deliver energy to load through wiring structures. In terms of electron mobility, the first portion 100 may be higher than the second portion 102. Due to this, compared to when a dye layer is formed on the second portion 102, if the dye layer 120 is formed on the first portion 100, a ratio that the excited electros are transferred to the wiring structures and the load is increased such that a solar cell with improved photovoltaic conversion efficiency can be provided.

By delivering energy to the load, electrons losing their energy may be transferred to the conductive layer 152 through the wiring structure (not shown). The electrons transferred to the conductive layer 152 may pass through the catalytic layer 154 and the electrolyte 160 and may return to the dye layer 120. Through this electron circulatory system, a dye sensitive solar cell can continuously generate current through a solar light.

A solar cell will be described according to the first embodiment of the present invention.

FIG. 1D is a sectional view illustrating a solar cell according to the first embodiment of the present invention. FIG. 1A is a sectional view illustrating the bottom substrate included in the solar cell according to the first embodiment of the present invention.

Referring to FIGS. 1A and 1D, the bottom substrate 100 having an active surface is prepared. The bottom substrate 100 is formed by preparing a substrate with the first portion 100 and the second portion 102 of respectively different grain sizes and exposing the top surface of the first portion 100 after removing of the second portion 102. The active surface may be the top surface of the first portion 100. The first portion 100 and the second portion 102 include a plurality of grains, and the maximum grain size of the second portion 102 may be smaller than the minimum grain size of the first portion 100.

The top substrate 140 spaced from the bottom substrate 100 may be disposed. The top substrate 140 may include an outgoing plane facing one surface of the bottom substrate 100 and an incident plane facing the outgoing plane. A photovoltaic conversion layer may be interposed between the bottom substrate 100 and the top substrate 140.

The photovoltaic conversion layer is disposed on the active surface of the bottom substrate 100 and may include a semiconductor electrode layer 130 with electrode dots 110, a dye layer 120 adsorbed on the surfaces of the electrode dots 100, and an electrolyte 160 filling between bottom substrate 100 and the top substrate 140. The electrode dots 110 may contact the active surface of the bottom substrate 100.

A catalytic layer 154 may be interposed between the photovoltaic conversion layer and the top substrate 140. A conductive layer 152 may be interposed between the catalytic layer 154 and the top substrate 140. The conductive layer 152 and the catalytic layer 154 may be sequentially disposed on the outgoing plane of the top substrate 140.

The bottom substrate 100 may include a conductive material. For example, the bottom substrate 100 may include at least one of metals or metal alloys. The bottom substrate 100 may be entirely formed of a conductive material. Unlike this, the bottom substrate 100 may include a conductive material coated glass or a polymer layer.

The electrode dots 110 may be formed of metal oxides including a transition metal oxide. For example, the electrode dots 110 may include at least one of a titanium oxide, a tin oxide, a zirconium oxide, a magnesium oxide, a niobium oxide, or a zinc oxide.

The dye layer 120 may include dye molecules that convert light energy into electrical energy. Ruthenium complex may be used as the dye material. For example, the dye may include N719(Ru(dcbpy)2(NCS)2 containing 2 protons. Additionally, at least one of well-known various dyes such as N712, Z907, Z910, and K19 may be used for a dye sensitive solar cell according to the present invention.

The electrolyte 160 may include redox iodide electrolyte. For example, the electrolyte 160 may be an electrolyte solution of $I_3^-/I^-$ obtained by dissolving 1-vinyl-3-hexyl-imidazolium iodide of about 0.7 with 0.1M LiI and 40 mM $I_2$(Iodine) in 3-Methoxypropionitrile. Unlike this, the electrolyte 160 may be an acetonitrile solution including 0.6M butylmethylimidazolium, 0.02M I2, 0.1M Guanidinium thiocyanate, and 0.5M 4-tert-butylpyridine. However, one of unmentioned various electrolytes may be used for a dye sensitive solar cell according to the present invention. For example, the electrolyte 160 may include alkylimidazolium iodides or tetra-alkyl ammoniumiodides and may further include tert-butylpyridin (TBP), benzimidazole (BI), and N-Methylbenzimidazole (NMBI) as surface additives. Moreover, acetonitrile, propionitrile or a mixture of acetonitrile and valeronitrile may be used as a solvent.

The top substrate 140 may include glass. The conductive layer 152 may include at least one of ITO, $SnO_2$, FTO, ZnO, and a carbon nano tube. The catalytic layer 154 may be formed by applying platinum of about 5 $\mu g/cm^2$ to about 10 $\mu g/cm^2$ on the conductive layer 152. The catalytic layer 154 may contact the electrolyte 160. Accordingly, the catalytic layer 154 may reduce the electrolyte 160 by injecting electrons returning from their activated states into the electrolyte 160. For example, if the electrolyte 160 includes triiodide, the triiodide may be reduced to iodide.

A wiring structure (not shown) connecting the bottom substrate 100 with the conductive layer 154 may be disposed. The wiring structure (not shown) may include a load and the load may consume energy.

Unlike the solar cell according to the first embodiment of the present invention, the top surface of the bottom substrate may include an uneven structure. This will be described with reference to FIG. 2.

A solar cell and a method of manufacturing the same will be described according to a modified embodiment of the present invention.

Figure 2:
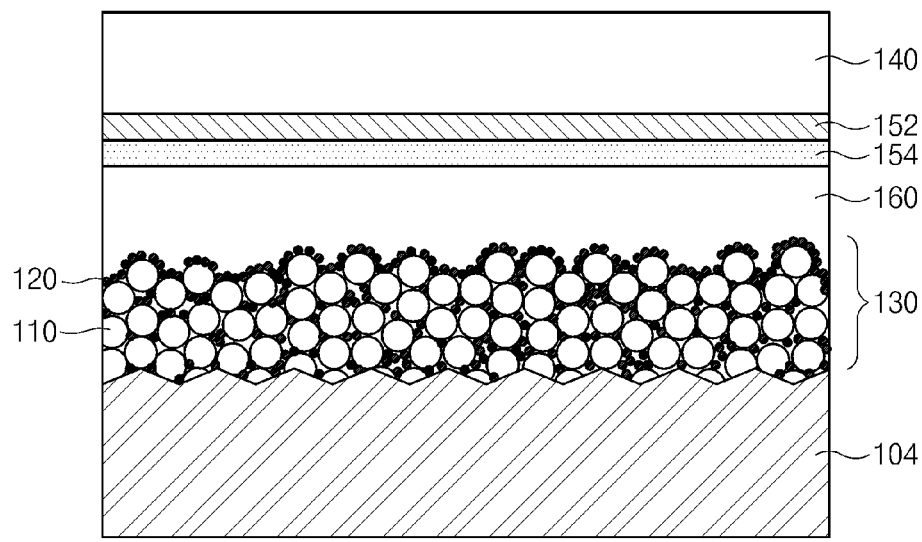
FIG. 2 is a sectional view illustrating a solar cell and a method of manufacturing the same according to a modified embodiment of the first embodiment of the present invention and a method of manufacturing the same.

FIG. 2 is a sectional view illustrating a solar cell and method of manufacturing the same according to a modified embodiment of the first embodiment of the present invention and a method of manufacturing the same.

Referring to FIG. 2, as described with reference to FIGS. 1A and 1B, the bottom substrate 100 where the second portion 102 is removed may be prepared. An uneven structure is formed on the top surface of the bottom substrate 100 such that the bottom substrate 104 included in the solar cell according to a modified embodiment of the first embodiment of the present invention may be formed. The bottom substrate 104 may be formed by processing the first portion 100 of the bottom substrate 104 using a chemical material that reacts to the first portion of the bottom substrate 104. For example, if the first portion 100 of the bottom substrate is formed of metal or metal alloy, a method of corroding the surface of the first portion 100 using an acid solution or a method of electrochemically corroding the surface of the first portion 100 by applying a predetermined voltage to an acid solution may be used.

As described with reference to FIG. 1.B, the semiconductor electrode layer 130 including the electrode dots 110 is formed on the bottom substrate 104 having the top surface of an uneven structure, and the dye layer 120 may be adsorbed on the surface of the electrode dots 110. Then, referring to FIG. 1C, the conductive layer 152 and the catalytic layer 154 may be sequentially formed on the outgoing plane of the substrate 140. As described with reference to FIG. 1D, the top substrate structure including the conductive layer 152, the catalytic layer 154, and the top substrate 140 may be disposed on the bottom substrate 104, and an electrolyte 160 may be injected between the top substrate 140 and the bottom substrate 104.

According to a modified embodiment of the first embodiment of the present invention, since the top surface of the bottom substrate 104 has an uneven structure, effective contact area between the semiconductor electrode layer 130 and the bottom substrate 104 may be increased. Due to this, electrons injected from the dye layer 120 to the semiconductor electrode layer 130 are more easily delivered to the bottom substrate 104, such that photovoltaic conversion efficiency can be increased.

A method of manufacturing a solar cell will be described according to a second embodiment of the present invention.

Figure 3A:
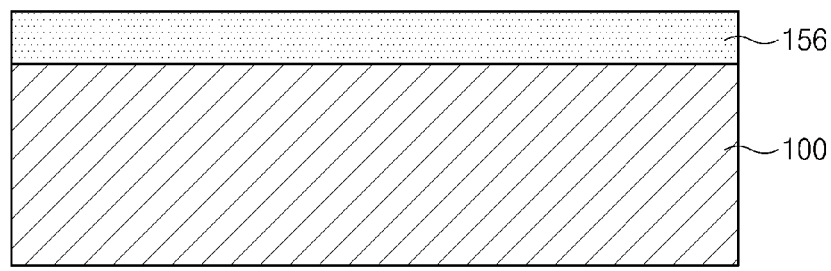
FIGS. 3A through 3C are sectional views illustrating solar cell and a method of manufacturing the same according to the second embodiment of the present invention.
Figure 3B:
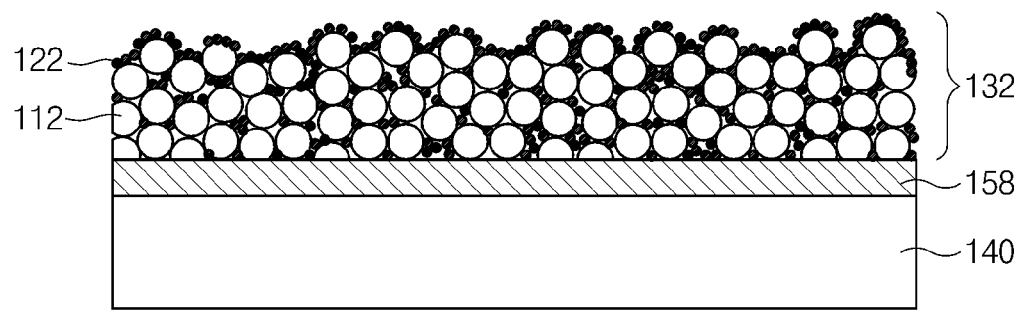
Figure 3C:
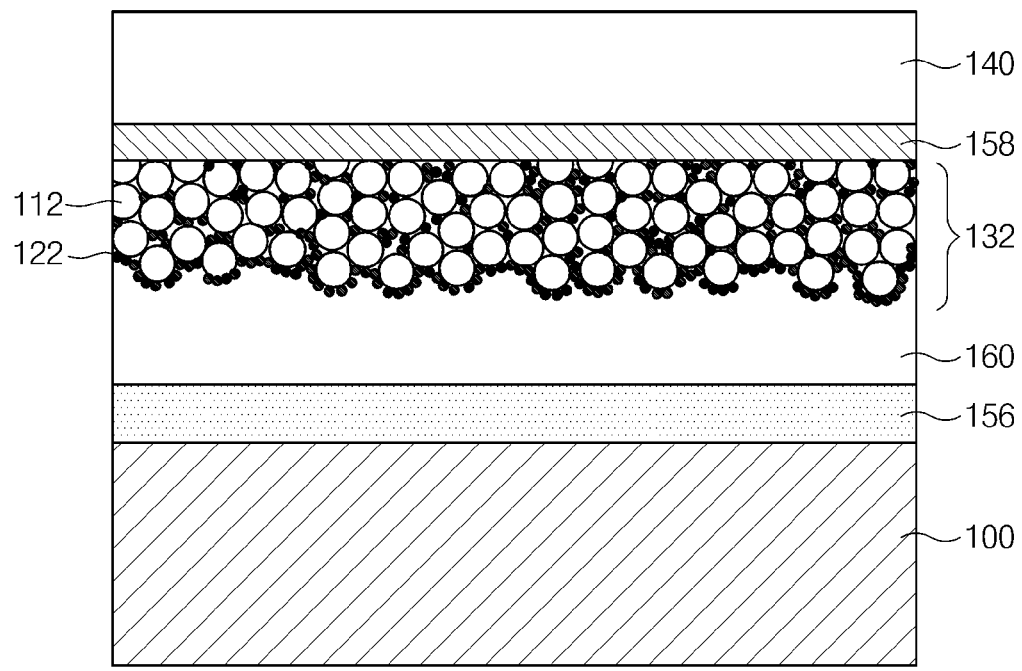

FIGS. 3A through 3C are sectional views illustrating a method of manufacturing a solar cell according to the second embodiment of the present invention.

Referring to FIG. 3A, as described with reference to FIGS. 1A and 1B, the first portion 100 of the bottom substrate where the second portion 102 is removed may be prepared. The catalytic layer 156 may be formed using the same method as the catalytic layer 154 described with reference to FIG. 1C.

Referring to FIG. 3B, a conductive layer 158 may be formed on the outgoing plane of the top substrate 140 described with reference to FIG. 1C. The conductive layer 158 may be formed using the same method as the conductive layer 152 described with reference to FIG. 1C. A semiconductor electrode layer 132 including electrode dots 112 may be formed on the conductive layer 158, and the dye layer 122 may be adsorbed on the surface of the electrode dots 112. The semiconductor electrode layer 132 and the dye layer 122 may be formed using the same method as the semiconductor electrode layer 130 and the dye layer 120 described with reference to FIG. 1B, respectively. The electrode dots 112 may contact the conductive layer 158. The conductive layer 158 may be disposed between the semiconductor electrode layer 132 and the top substrate 140.

Referring to FIG. 3C, as described with reference to FIG. 1D, a top substrate structure including the dye layer 122, the semiconductor electrode layer 132, the conductive layer 158, and the top substrate 140 may be disposed on the first portion 100 of the bottom substrate. As described with reference to FIG. 1D, an electrolyte 160 may be injected between the top substrate 140 and the first portion 100 of the bottom substrate.

According to the second embodiment of the present invention, light incident to the incident plane of the top substrate 140 penetrates the conductive layer 158 and then may be projected on the dye layer 122. Electrons of the dye layer 122 may be excited by the light projected on the dye layer 122.

The excited electrons of the dye layer 122 may be delivered to the conductive layer 158 through the electrode dots 112. The electrons delivered to the conductive layer 158 may deliver energy to a load through a wiring structure, and the electrons completing the delivering of the energy may return to the dye layer 122 through the first portion 100 of the bottom substrate, the dye layer 156, and the electrolyte 160.

A solar cell according to the second embodiment of the present invention will be described.

FIG. 3C is a sectional view illustrating a solar cell according to the second embodiment of the present invention.

Referring to FIG. 3C, as described with reference to FIGS. 1A and 1D, a bottom substrate 100 having an active surface formed by removing a second portion 102 may be prepared. A top substrate 140 spaced from the bottom substrate 100 may be disposed. The top substrate 140 may include an outgoing plane facing one surface of the bottom substrate 100 and an incident plane facing the outgoing plane. A conductive layer 158 may be disposed on the outgoing plane of the top substrate 140. A catalytic layer 156 may be disposed on the one surface of the bottom substrate 100. A photovoltaic conversion layer may be interposed between the bottom substrate and the top substrate 140. The photovoltaic conversion layer may be disposed between the catalytic layer 156 and the conductive layer 158. The conductive layer 158 may be disposed between the photovoltaic conversion layer and the top substrate 140.

The photovoltaic conversion layer is disposed on the outgoing plane of the top substrate 140 and may include a semiconductor electrode layer 132 including the electrode dots 111, a dye layer 122 adsorbed on the surface of the electrode dots 112, and an electrolyte 160 filling between the bottom substrate 100 and the top substrate 140.

The electrode dots 112, the dye layer 122, the catalytic layer 156, and the conductive layer 158 may include the same materials as those 110, 120, 154, and 152, respectively, described with reference to FIG. 1D.

A wiring structure connecting the bottom substrate 100 with the conductive layer 158 may be disposed. The wiring structure may include a predetermined load and the load may consume energy.

Unlike the solar cell according to the second embodiment of the present invention, the top surface of the bottom substrate 100 may include an uneven structure. This will be described with reference to FIG. 4.

Figure 4:
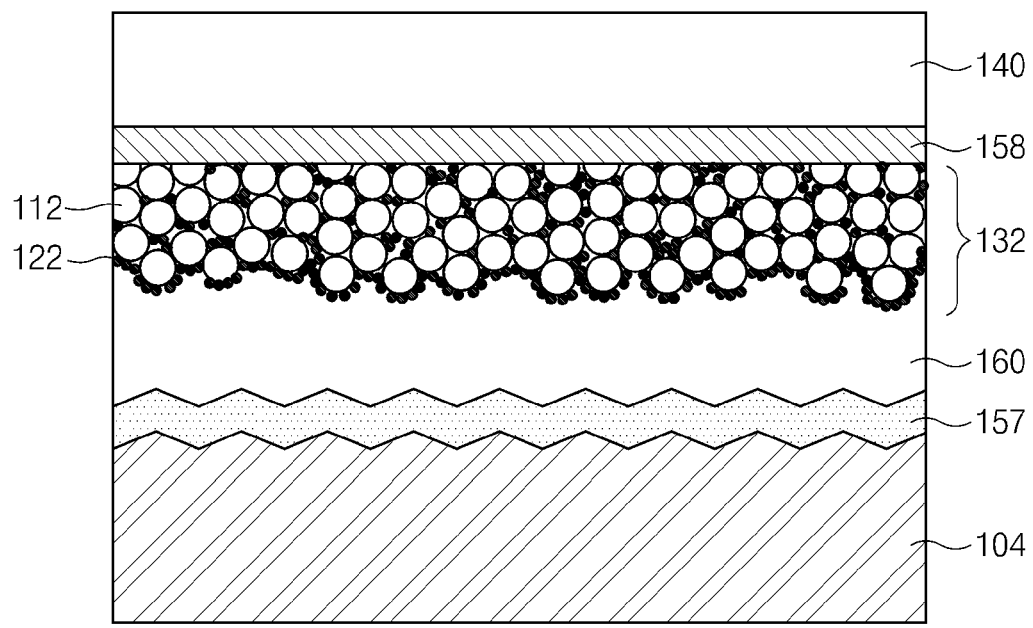
FIG. 4 is a sectional view illustrating a solar cell and a method of manufacturing the same according to a modified embodiment of the second embodiment of the present invention and a method of manufacturing the same.

A solar cell according to a modified embodiment of the second embodiment of the present invention and a method of manufacturing the same will be described. FIG. 4 is a sectional view illustrating a solar cell and a method of manufacturing the same according to a modified embodiment of the second embodiment of the present invention.

Referring to FIG. 4, as described with reference to FIGS. 1A and 1B, a bottom substrate 100 where the second portion 102 is removed may be prepared. With an uneven structure on the top surface of the bottom substrate 100, a bottom substrate 104 included in the solar cell according to a modified embodiment of the second embodiment of the present invention may be formed. The bottom substrate 104 having the uneven structure may be formed using the method described with reference to FIG. 2.

A catalytic layer 157 may be formed on the bottom substrate 104 having the top surface of the uneven structure. Because of the uneven structure of the bottom substrate 104, the catalytic layer 157 may have an uneven structure. The catalytic layer 157 may be formed using the same method as the catalytic layer 156 described with reference to FIG. 3A. Then, as described with reference to FIGS. 3B and 3C, a conductive layer 158, a semiconductor electrode layer 132 including electrode dots 112, and a dye layer 122 adsorbed on the surfaces of the electrode dots 112 are formed on the outgoing plane of the top substrate 140 and an electrolyte 160 may be injected between the top substrate 140 and the bottom substrate 104.

In first and second embodiments of the present invention and other modified embodiments, a dye sensitive layer is used as a photovoltaic conversion layer. Unlike this, a semiconductor layer using a PN or PIN junction may be used as the photovoltaic conversion layer. This will be described with reference to FIG. 5 and FIGS. 6A through 6D.

Figure 5:
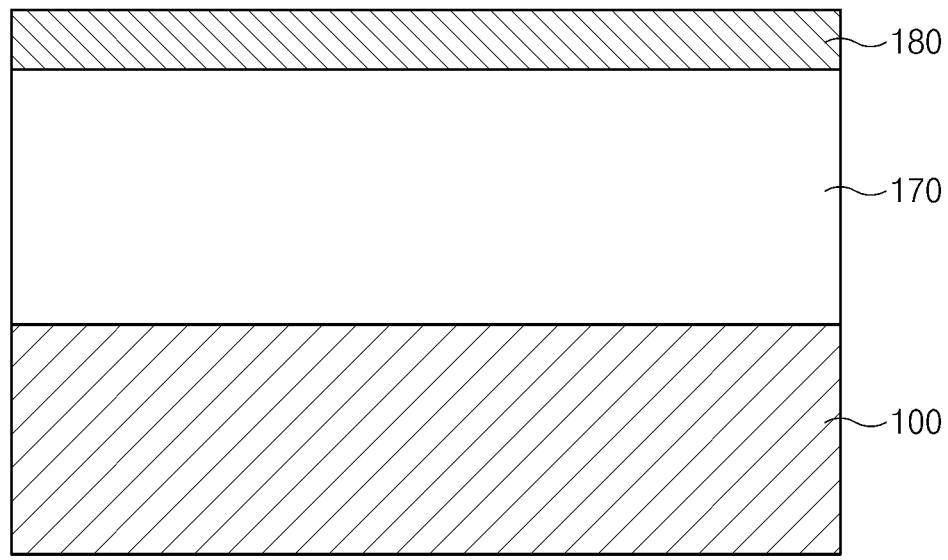
FIG. 5 is a view illustrating a solar cell and a method of manufacturing the same according to the third embodiment of the present invention.

A solar cell and a method of manufacturing the same according to a third embodiment of the present invention will be described. FIG. 5 is a view illustrating a solar cell and a method of manufacturing the same according to the third embodiment of the present invention.

Referring to FIG. 5, as described with reference to FIGS. 1A and 1D, a bottom substrate 100 having an active surface formed by removing the second portion 102 is prepared. A top substrate 180 may be disposed on the bottom substrate 100. A photovoltaic conversion layer 170 may be interposed between the bottom substrate 100 and the top substrate 180. The top substrate 180 may include a transparent conductive material. For example, the top substrate 180 may include one of ZnO:Al, ZnO:Ga, ITO, $SnL_2$, SnO:F, $RuO_2$, $IrO_2$, or $Cu_2O$. A glass layer and/or an anti-reflection layer may be further formed on the top substrate 180. The photovoltaic conversion layer 170 may include semiconductor layers having respectively different conductive types. The photovoltaic conversion layer 170 may include at least one of Si, SiGe, CuInSe, CuInS, GuInGaSe, CuInGaS, CdS, ZnO, ZnS, CuZnSnS, CuZnSnSe, Cu2O, GaAs, GaInAs, GaInAlAs, or InP.

Modified examples of the photovoltaic conversion layer 170 according to the third embodiment of the present invention will be described. FIGS. 6A through 6D are views illustrating modified examples of the photovoltaic conversion layer 170 according to the third embodiment of the present invention.

Figure 6A:
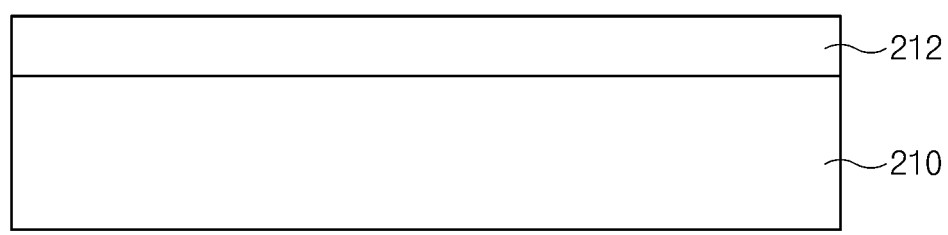
FIGS. 6A through 6D are views illustrating examples of the photovoltaic conversion layer included in a solar cell according to the third embodiment of the present invention.

Referring to FIG. 6A, the photovoltaic conversion layer 171 may include a first semiconductor layer 210 of a first conductive type on the bottom substrate 100 and a second semiconductor layer 212 of a second conductive type on the first semiconductor layer 210. The first semiconductor layer 210 may be thicker than the second semiconductor layer 212. In this case, the first semiconductor layer 210 may be doped with a P type dopant and the second semiconductor layer 212 may be doped with an N type dopant.

Figure 6B:
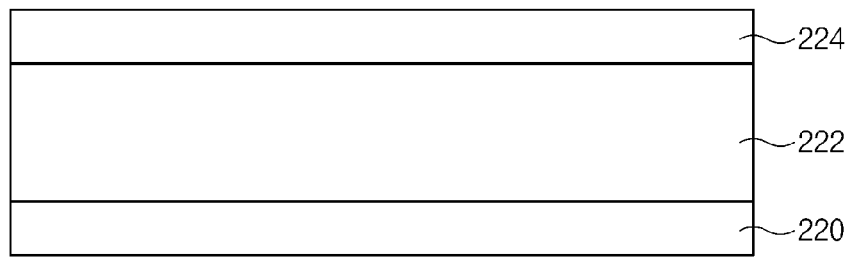

Referring to FIG. 6B, the photovoltaic conversion layer 172 may include a first semiconductor layer 220 of a first conductive type, an intrinsic semiconductor layer 222, and a second semiconductor layer 224, which are sequentially stacked on the bottom substrate 100. The intrinsic semiconductor layer 222 may be interposed between the first semiconductor layer 220 and the second semiconductor layer 224. The first semiconductor layer 220 and the second semiconductor layer 224 may be spaced apart from each other.

Figure 6C:
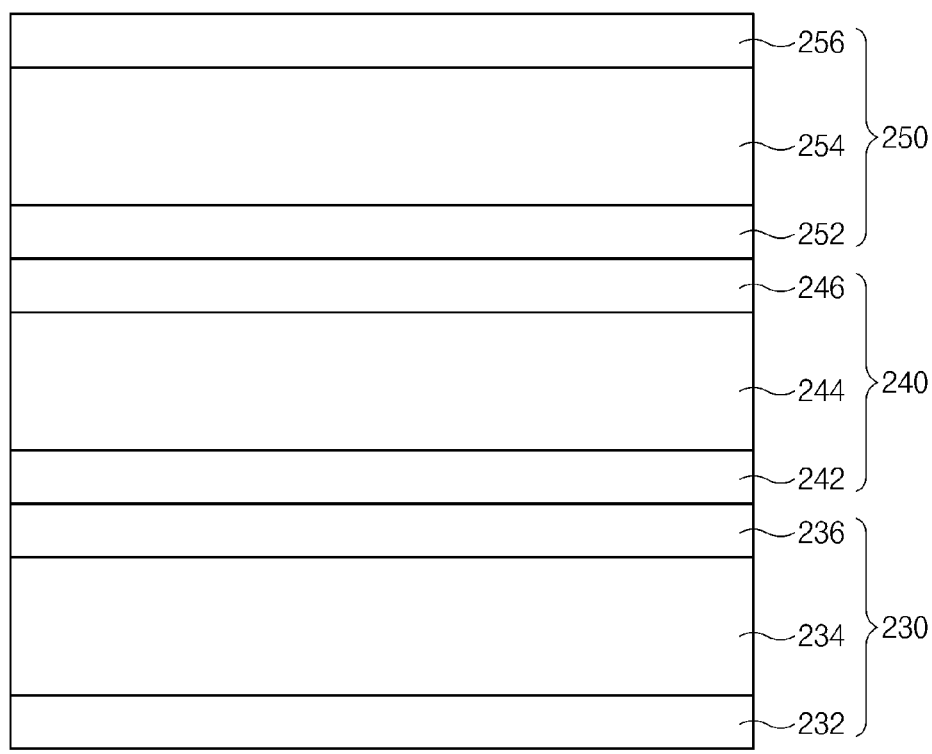

Referring to FIG. 6C, the photovoltaic conversion layer 173 may have a multi-junction structure including a plurality of stacked PIN diodes 230, 240, and 250. The first PIN diode 230 may include a first semiconductor layer 232 of a first conductive type, a second semiconductor layer 234 of an intrinsic state on the first semiconductor layer 234, and a third semiconductor layer 236 of a second conductive type on the second semiconductor layer 234. The second PIN diode 240 may be disposed on the third semiconductor layer 236 of the first PIN diode 230. The second PIN diode 240 may include a fourth semiconductor layer 242 of the first conductive type, a fifth semiconductor layer 244 of an intrinsic state, and a sixth semiconductor layer 246 of the second conductive type, which are sequentially stacked on the third semiconductor layer 236. The third PIN diode 250 may include a seventh semiconductor layer 252 of the first conductive type, an eighth semiconductor layer 254 of an intrinsic state, and a ninth semiconductor layer 256 of the second conductive type, which are sequentially stacked on the sixth semiconductor layer 246. Although three PIN diodes 230, 240, and 250 are illustrated in the drawings, the photovoltaic conversion layer 173 may include two or more than four PIN diodes.

Figure 6D:
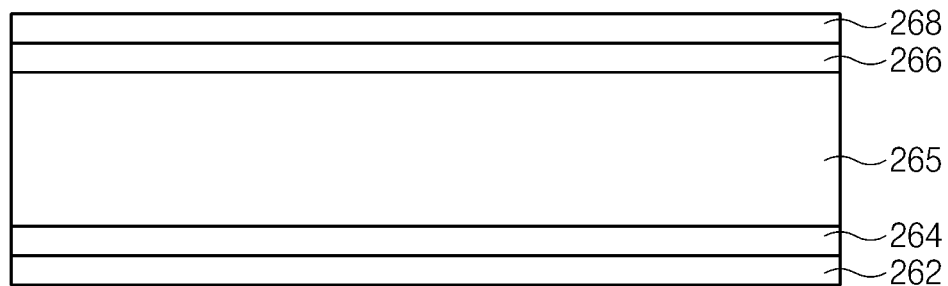

Referring to FIG. 6D, the photovoltaic conversion layer 174 may have a hetrojunction with intrinsic thin (HIT) layer structure where a single crystal silicon layer and an amorphous silicon layer are mixed. The photovoltaic conversion layer 174 may include a first amorphous silicon layer 262 of a first conductive type, a second amorphous silicon layer 264 of an intrinsic state, a single crystal silicon layer 265 of the first conductive type, a third amorphous silicon layer 266 of intrinsic state, and a fourth amorphous silicon layer 268 of the second conductive type, which are sequentially stacked. The first conductive type may be an N type. The amorphous silicon layers 262, 264, 266, and 268 may be thinner then the single crystal silicon layer 265.

Figure 7:
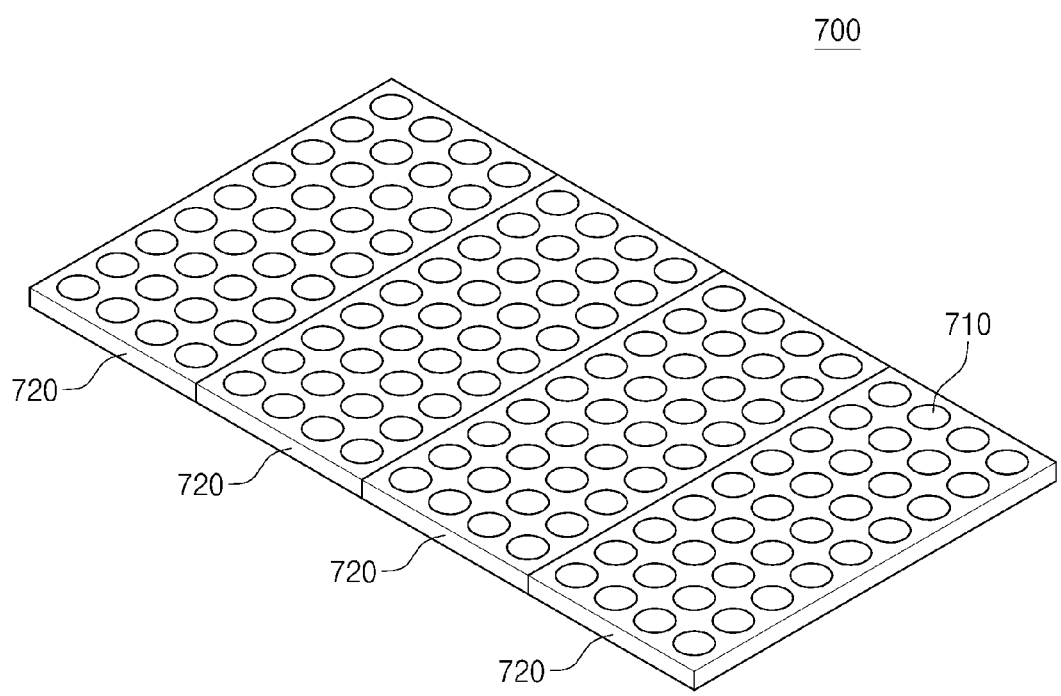
FIG. 7 is a view illustrating a solar cell array using a solar cell according to embodiments of the present invention.

An application example of a solar cell according to embodiments of the present invention will be described. FIG. 7 is a view illustrating a solar cell array using a solar cell according to embodiments of the present invention.

Referring to FIG. 7, the solar cell array 700 may configured with at least one solar cell module 720 installed at a main frame (not shown). The solar cell module 720 may include a plurality of solar cells 710. The solar cell 710 may be a solar cell according to embodiments of the present invention. The solar cell array 700 may be installed toward the south at a predetermined angle to receive solar light more effectively.

The above mentioned solar cell module or solar cell array may be disposed on a car, a house, a building, a boar, a beacon, a traffic signal system, a portable electronic device, and various structures and then may be used.

Figure 8:
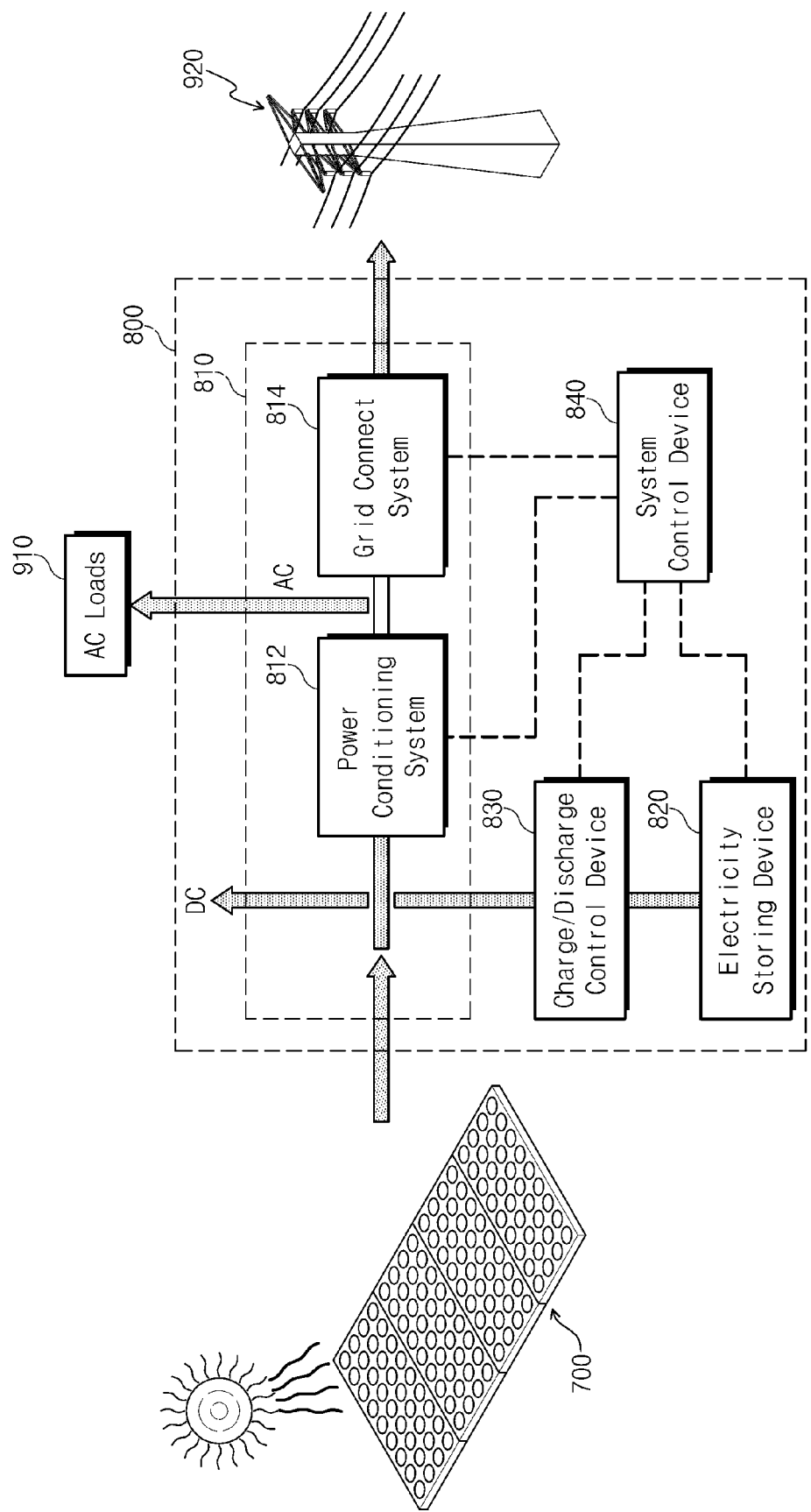
FIG. 8 is a view illustrating an example of a solar photovoltaic system using a solar cell according to embodiment of the present invention.

FIG. 8 is a view illustrating an example of a solar photovoltaic system using a solar cell according to embodiment of the present invention.

Referring to FIG. 8, the solar photovoltaic system may include the solar cell array 700 and a power control device 800 for receiving power from the solar cell array 700 and transmitting the received power to the external. The power control device 800 may include an output device 810, an electricity storing device 820, a charge/discharge control device 830, and a system control device 840. The output device 810 may include a power conditioning system (PCS) 812.

The PCS 812 may be an inverter that converts a DC current from the solar cell array 700 into an AC current. Since the solar light is not available at night and is less useful at a cloudy day, power generated may be decreased. The electricity storing device 820 may store electricity so that the generated power is not changed depending on weather. The charge/discharge control device 830 may store power from the solar cell array 700 in the electricity storing device 810 or outputs the electricity stored in the electricity storing device 820 to the output device 810. The system control device 840 may control the output device 810, the electricity storing device 820, and the charge/discharge control device 830.

As mentioned above, the converted AC current may be supplied for various AC loads 910 such as a car and a house. Furthermore, the output device 810 may further include a grid connect system 814. The grid connect system 814 may output power to the external using a connection with the power system 920.

According to an embodiment of the present invention, a bottom substrate including a first portion and a second portion with a smaller grain than the first portion is provided and the second portion is removed. A photovoltaic conversion layer is formed on the first portion having a higher optical reflectivity and electron mobility than the second portion, such that a solar cell with improved photovoltaic conversion efficiency can be provided.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of manufacturing a solar cell, the method comprising
    preparing a bottom substrate including sequentially stacked first and second portions, each of the first and second portions including a plurality of grains, wherein a maximum grain size of the second portion is less than a minimum grain size of the first portion;
    exposing the first portion of the bottom substrate by substantially removing the entire second portion of the bottom substrate; and
    forming a photovoltaic conversion layer on the first portion of the bottom substrate.

2. The method of claim 1, wherein dispersion of sizes of the grains in the second portion of the bottom substrate is greater than that of the grains in the first portion of the bottom substrate.

3. The method of claim 1, wherein the second portion comprises a metal oxide.

4. The method of claim 1, wherein the second portion is removed using an etching process.

5. The method of claim 4, wherein the etching process is a wet etching process.

6. The method of claim 1, wherein the second portion is removed using a polishing process or a sanding process.

7. The method of claim 1, further comprising forming a top substrate on the bottom substrate,
    wherein the forming of the photovoltaic conversion layer comprises:
    forming a semiconductor electrode layer including electrode dots on the first portion of the bottom substrate;
    adsorbing a dye layer on surfaces of the electrode dots;
    disposing the top substrate on the semiconductor electrode layer; and
    injecting an electrolyte between the bottom substrate and the top substrate.

8. The method of claim 1, further comprising forming a top substrate including an incident plane and an outgoing plane facing the incident plane on the bottom substrate,
    wherein the forming of the photovoltaic conversion layer comprises:
    forming a semiconductor electrode layer with electrode dots on the outgoing plane of the top substrate;
    adsorbing a dye layer on surfaces of the electrode dots;
    disposing the top substrate on the bottom substrate; and
    injecting an electrolyte between the bottom substrate and the top substrate.

9. The method of claim 1, wherein the forming of the photovoltaic conversion layer comprises:
    forming a first semiconductor layer doped with a dopant of a first conductive type on the first portion of the bottom substrate; and
    forming a second semiconductor layer doped with a dopant of a second conductive type on the first semiconductor layer.

* * * * *